Oct. 28, 1969 J. W. WILKIE ET AL 3,474,693
BAND TYPE CUTOFF SAW FOR DEEP WORKPIECES
Original Filed Feb. 23, 1967 4 Sheets-Sheet 3
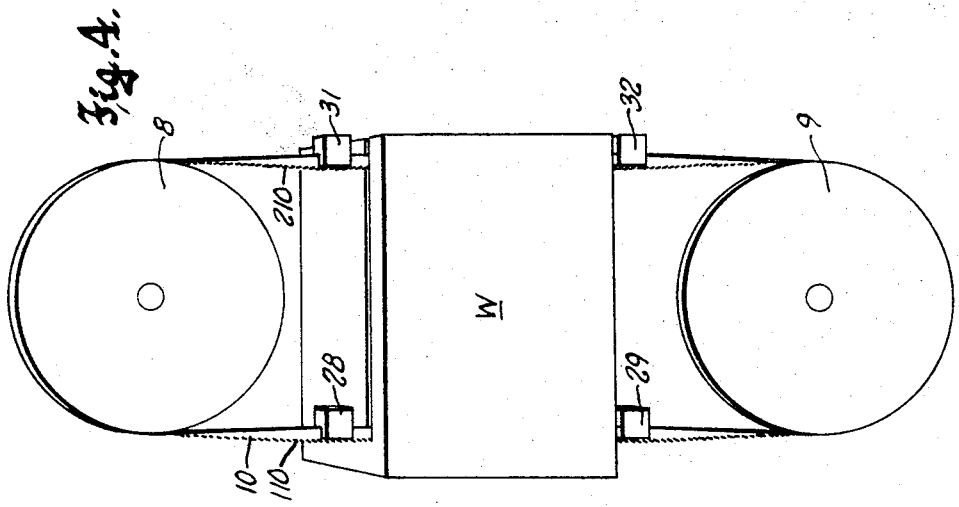
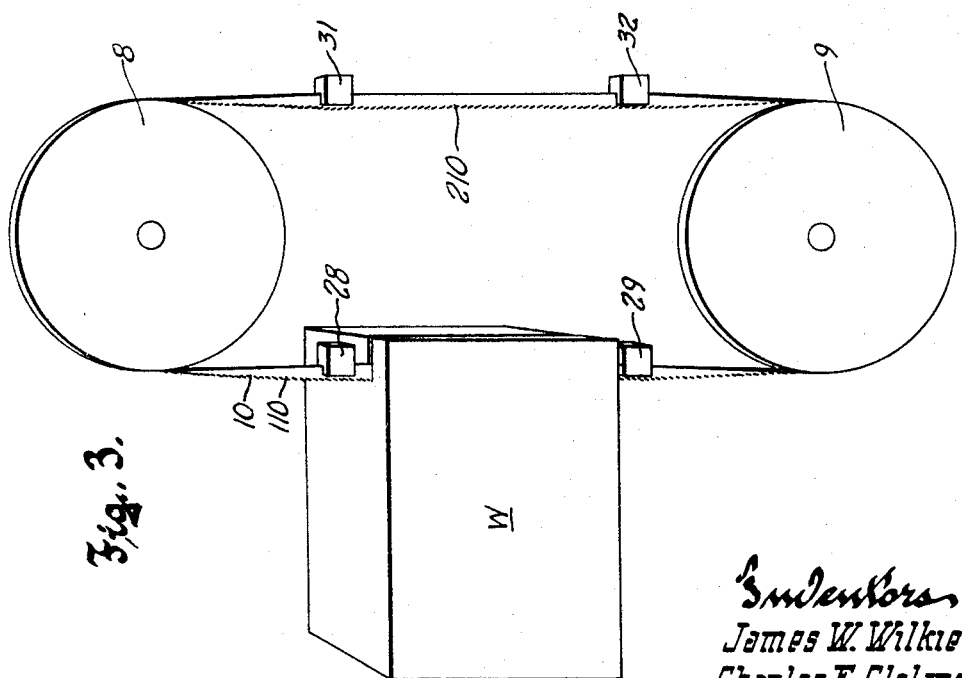
Inventors
James W. Wilkie
Charles E. Cleland Oct. 28, 1969    J. W. WILKIE ET AL    3,474,693
BAND TYPE CUTOFF SAW FOR DEEP WORKPIECES
Original Filed Feb. 23, 1967    4 Sheets-Sheet 4
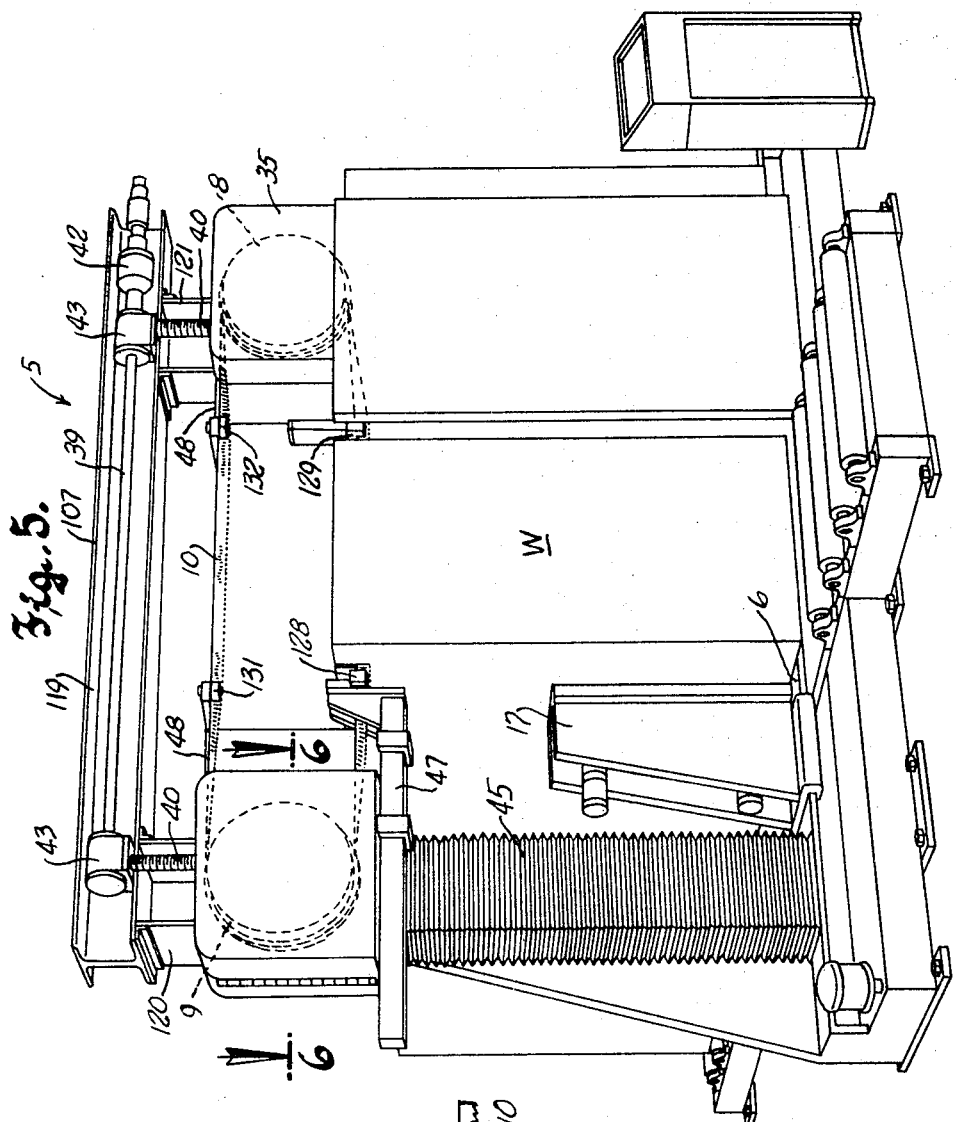
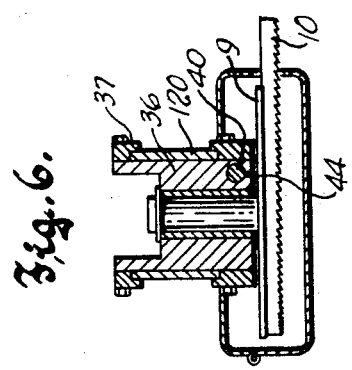
Inventors
James W. Wilkie
Charles E. Cleland United States Patent Office 3,474,693
Patented Oct. 28, 1969

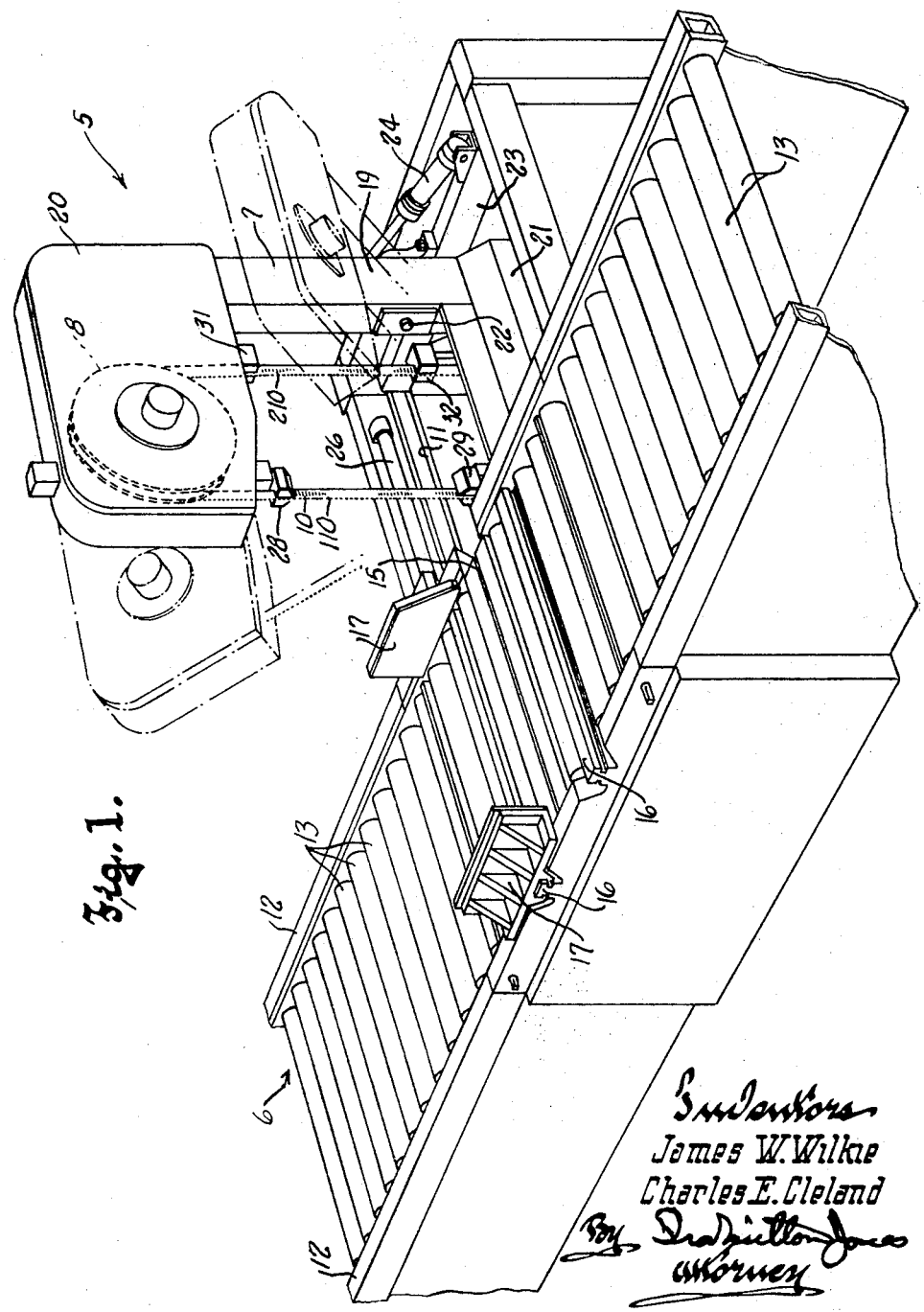

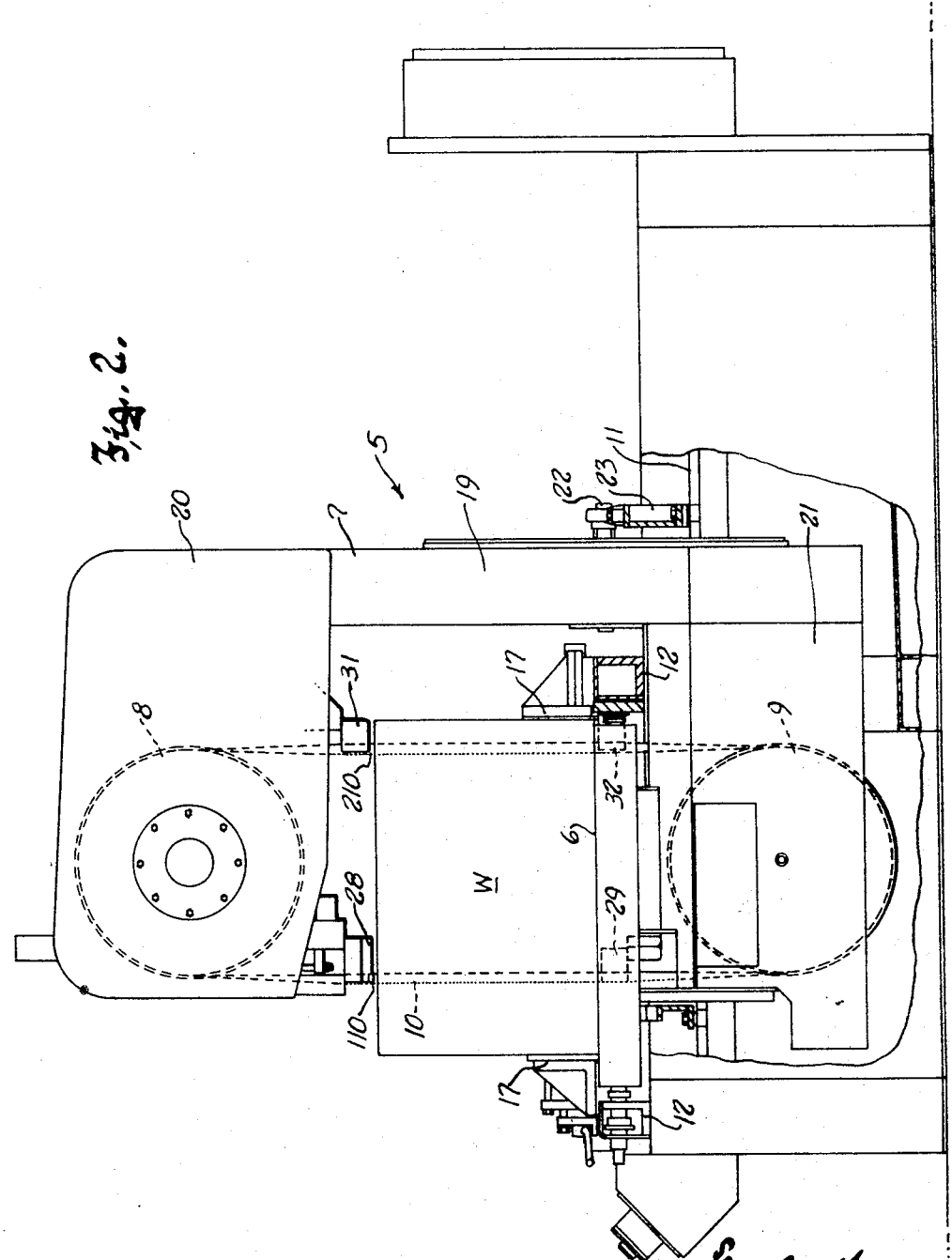

3,474,693
**BAND TYPE CUTOFF SAW FOR
DEEP WORKPIECES**
James W. Wilkie, Hopkins, and Charles E. Cleland, Edina,
Minn., assignors to Continental Machines, Inc., Savage,
Minn., a corporation of Minnesota
Continuation of application Ser. No. 618,185, Feb. 23,
1967. This application Oct. 23, 1968, Ser. No. 770,131
Int. Cl. B26d 1/46
U.S. Cl. 83—201.07                    6 Claims

ABSTRACT OF THE DISCLOSURE

The rear stretch of the saw band is engaged by saw guides similar to those that engage its front cutting stretch and which hold the rear stretch coplanar with the cutting stretch so that it can enter the kerf. In one embodiment the band wheels are mounted for unison up and down motion relative to the frame.

---

This invention, like that of the copending application Ser. No. 618,185 filed Feb. 23, 1967, now abandoned, of which is is a continuation, relates generally to band machines and refers more particularly to band type cutoff machines by means of which a straight cut can be made through a substantially large billet, beam, rod or the like to divide the workpiece into short lengths.

The endless saw band of a band cutoff machine is trained around two or more pulleys or band wheels, at least one of which is rotatably driven. Where two band wheels are used, they are normally of the same size, and they provide front and rear stretches of the saw band having equal lengths. Spaced saw guides on the machine cooperate to hold the medial portion of the front stretch twisted at 90 degrees to the remainder thereof, to define a cutting stretch of the band in which its toothed cutting edge faces outwardly of the band orbit. The band wheels are mounted on structure which carries them for bodily motion in a direction parallel to the surfaces of the cutting stretch so that the latter can be moved edgewise through a workpiece that is held stationary on a work support.

With increasing use of band type cutoff machines there has come a demand for machines of this kind that are capable of handling stock of increasingly greater depths. Heretofore the depth of stock that a band type cutoff machine could cut through was limited by the distance between the front and rear stretches of its blade, and in the case of a machine having two band wheels this distance was of course substantially equal to the diameter of the wheels. Thus if a two-wheel band machine were to be used for cutting stock of depths up to 60 inches, it had to have band wheels in excess of 60 inches in diameter. But band wheels of that size require excessively large and expensive machine structures.

It would be possible to provide substantially large throat depth in a band type cutoff saw by using four relatively small band wheels with their axes arranged at the four corners of a rectangle, but a machine incorporating such an arrangement would also entail an expensive machine design and would have certain other well known disadvantages, not the least of which would be the shortening of band life that would result from the oft-repeated flexture of the band as it moved onto and off of successive band wheels along its orbit.

With the foregoing considerations in mind it is a general object of this invention to provide a band type cutoff machine which has only two band wheels of normal size but which is nevertheless capable of accommodating work pieces having a depth substantially greater than the diameter of its band wheels.

More specifically, it is an object of this invention to provide very simple means in a band type cutoff saw having two band wheels for enabling both stretches of the saw band to enter the kerf that the band produces during the course of a cutting stroke, so that the machine can cut through workpieces having depths substantially greater than the distance between stretches of the band.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 1 is a front perspective view of a band cutoff saw embodying the principles of this invention:

FIGURE 2 is a view in side elevation, with portions cut away, of the mcahine shown in FIGURE 1;

FIGURE 3 is a diagrammatic perspective view showing the relationship of the band and band wheels in a cutoff machine of this invention to a work piece into which the machine has started to make a cut;

FIGURE 4 is a view similar to FIGURE 3 but showing conditions near the end of the cut through the workpiece;

FIGURE 5 is a front perspective view of a modified embodiment of a cutoff saw embodying the principles of this invention, intended for use on very large billets and the like; and FIGURE 6 is a horizontal sectional view taken on the plane of the line 6—6 in FIGURE 5.

Referring now more particularly to the accompanying drawings, the numeral 5 designates generally a band type cutoff saw embodying the principles of this invention and comprising, in general, an elongated horizontal work support 6 upon which a workpicee W is adapted to be secured, a generally C-shaped frame 7 upon which a pair of band wheels 8 and 9 are rotatably mounted, a saw band 10 trained around the band wheels, and ways 11 upon which the C-frame 7 is carried for horizontal motion in directions transverse to the work support.

The work support 6 comprises a pair of parallel side rails 12 which extend lengthwise of the work support and which cooperate in carrying a plurality of freely rotatable transverse rollers 13 upon which workpieces can be readily moved along the work support. One of the rails 12 is interrupted, as at 15, at the midpoint of its length to permit the saw band 10 to be carried across the work support as the C-frame 7 is moved along its ways 11, thus defining a cutting zone. Near the cutting zone the work support has fixed rail-like guide elements 16 which bridge the side rails 12 and each of which is cooperable with a pair of vise jaw members 17 that are arranged to be converged along the guide element for securing a work piece at any desired position along the work support by clampingly engaging opposite upright faces of it.

The C-frame comprises a generally upright trunk 19 and upper and lower arms 20 and 21 that project forwardly from the trunk and respectively carry the band wheels 8 and 9 near their front ends, maintaining the band wheels in vertically spaced relation by which the band 10 that is trained around them is provided with front and rear stretches 110 and 210 respectively.

The trunk of the C-frame has a pivotal connection 22 with a carriage 23 which rides upon the ways 11, to provides for tilting of the C-frame relative to the carriage about a horizontal axis that is generally parallel to the arms 20 and 21 of the C-frame and extends across the work support in the plane of the tops of the rollers 13. The C-frame can be swung to and locked in any desired position of its tilting motion by means of a hydraulic cylinder actuator 24 connected between the trunk 19 of the C-frame and the carriage 23, and hence the machine can be used for making both oblique and square cuts through a workpiece.

A second hydraulic cylinder 26, or a similar actuator, drives the carriage 23 along the ways 11 to advance the saw band through the work zone and cause it to cut through a workpiece therein.

The axes of the band wheels 8 and 9 are of course transverse to the direction of motion of the C-frame along the ways, and hence at the points where the front and rear stretches 110 and 210 of the saw band pass onto and off of the band wheels, the saw band is facing broadside to the direction of cutting motion. To cause the front stretch 110 of the saw band to present its cutting edge to the workpiece, upper and lower saw guides 28 and 29 are respectively secured to the upper and lower arms of the C-frame, near the front ends thereof, and engage the front stretch of the band at spaced apart locations. These saw guides, which are generally conventional, hold the portion of the front band stretch that lies between them twisted at right angles to those portions of the front stretch that are adjacent to the band wheels, so that the portion of the band between the guides 28 and 29 constitutes a cutting stretch that is oriented with its side surfaces parallel to the directions of carriage motion along the ways 11, and with its toothed cutting edge forward.

It will be understood that one of the band wheels is power driven in the direction to cause the front stretch of the band to move downwardly. The drive means for this purpose has been omitted from the drawing for clarity, but may be like that of U.S. Patent No. 2,898,669.

Heretofore, it has been the usual practice to permit the upwardly moving rear stretch 210 of the saw band to run free between the band wheels, so that it presented a side surface to a workpiece as it approached the same toward the conclusion of a cutting stroke. As a result, the maximum depth of cut that could be made with the machine could never be greater than the distance between the toothed cutting edge of the front band stretch 110 and the front surface of the rear stretch 210.

According to the present invention, however, a second set of saw guides 31 and 32, also secured to the upper and lower arms 20 and 21 of the C-frame, engages the rear stretch 210 of the saw band. These last mentioned guides maintain the medial portion of the rear stretch of the blade twisted at right angles to the remainder thereof so that said medial portion is coplanar with the front cutting stretch and can readily enter the kerf that the cutting stretch has produced in a workpiece W, as illustrated in FIGURE 4.

It will be apparent, therefore, that a cutoff saw embodying the present invention will have an effective throat depth substantially greater than the diameter of its band wheels and, specifically, will be capable of cutting through workpieces having a depth substantially equal to the distance between the toothed front edge of the cutting stretch of the band and the trunk of the C-frame. Thus the length of the C-frame arms in a machine of this invention primarily determines the maximum depth of cut that can be made; and since the C-frame is accurately constrained to move in a fixed path transverse to the work support, very accurately located and straight cuts, either square or oblique, can be made through relatively large workpieces.

FIGURE 5 illustrates a band machine embodying the principles of this invention in another form. This machine is intended for cutting even larger workpieces; depths of four feet and upwards being well within its capacity. The C-frame 107 of the cutoff machine there illustrated has a horizontal trunk 119 and downwardly projecting arms 120 and 121 that are all fixed with respect to an elongated horizontal work support 6, straddling the latter with the trunk 119 extending transversely to the work support at a substantial elevation thereabove and with the arms 120 and 121 spaced to opposite sides of the work support. The band wheels 8 and 9, which again rotate on axes that extend parallel to the length of the work support, are journaled on carriers 35 and 36 that are movable along the upright arms of the C-frame. Each wheel carrier has a shoe portion 37 that engages its adjacent upright arm 120 or 121 of the C-frame to receive sliding guidance therefrom; hence the arms of the C-frame do not directly support the band wheels, but only serve as guideways for their carriers.

The two band wheel carriers are constrained to move up and down in unison by means of feed mechanism comprising a rotatable drive shaft 39 that extends parallel to and alongside the trunk portion 119 of the C-frame and upright jack screws 40 that are adjacent to respective arms 120 and 121 of the C-frame. The drive shaft 39 is powered by a hydraulic motor 42 or other drive means and is connected, as by means of bevel gear transmissions 43, with the two jack screws. Each jack screw extends through a threaded bore 44 in its wheel carrier by which rotation of the jack screw is translated into up and down motion of the wheel carrier. The lower portion of each jack screw is protected from dirt and the like by means of an axially extensible and collapsible boot 45 that extends between the base of the machine and the underside of the wheel carrier.

It will be understood that one of the band wheels is rotatably driven by power means (not shown) mounted on the carrier for said wheel to move up and down therewith.

As in the first described embodiment of the invention, spaced saw guides engage each stretch of a band 10 trained around the band wheels to hold the medial portion of the stretch twisted at right angles to its normal orientation. Thus guides 128 and 129, secured to inwardly projecting brackets 47 on the wheel carriers 35 and 36, near the bottoms of said carriers, engage the lower stretch of the band to hold a medial cutting portion thereof parallel to the vertical path of feeding motion and with its toothed edge lowermost; and brackets 48 extending inwardly from the band wheel carriers near their tops carry rear top guides 131 and 132 which engage the upper stretch of the band and hold its medial portion in coplanar relationship with the cutting stretch. The lower and upper stretches of the band, of course, correspond with the front and rear stretches of the band in the other embodiment of the invention, and in both, these stretches can be regarded as leading and trailing stretches.

Because the two stretches of the band are held twisted into coplanar relationship, the band wheels can be of normal size but the machine can nevertheless make cuts substantially deeper than the band wheel diameters. In fact the limit upon depth of stock that can be cut with the machine of FIGURE 5 is established only by the practicable elevation of the trunk 119 of the C-frame above the top surface of the work support.

From the foregoing description taken with the accompanying drawings it will be apparent that this invention provides very simple, inexpensive and effective means for providing a band type cutoff machine with an effective cutting stroke which is substantially greater than the diameter of its band wheels.

What is claimed as our invention is:

1. A band type cutoff machine comprising the combination of:
  (A) structure providing a horizontal work support having a cutting zone at a medial portion thereof in which a saw blade is receivable as it moves in a cutting stroke, the work support being adapted to hold a workpiece with the portion thereof through which a cut is to be made in the cutting zone;

(B) a pair of band wheels;

(C) wheel carrying structure, comprising a substantially C-shaped frame having a trunk portion and arms projecting therefrom, mounting the band wheels in spaced apart coplanar relationship for rotation on parallel generally horizontal axes, one of said band wheels being power driven;

(D) an endless saw band trained about said band wheels and having a leading stretch and a trailing stretch;

(E) first saw guide means mounted on said wheel carrying structure for motion with the band wheels and embracing the leading stretch of the band at spaced locations to hold the portion of the band between said locations twisted relative to the remainder of the leading stretch and in said plane;

(F) second saw guide means mounted on the wheel carrying structure for motion with the band wheels and embracing the trailing stretch of the band at spaced locations to hold the portion of the band between said locations twisted relative to the remainder of the trailing stretch and coplanar with said portion of the leading stretch; and (G) power means operatively connected with one of said structures for effecting relative motion between the two in the direction to cause the leading stretch of the blade to cut through a workpiece in the cutting zone, said second saw guide means enabling said portion to the trailing stretch to enter the kerf in the workpiece cut by the leading stretch.

2. The band type cutoff machine of claim 1, wherein the structure with which said power means is operatively connected is the wheel carrying structure.

3. The band type cutoff machine of claim 2, further characterized by:

(A) the band wheels being mounted on the arms of the C-shaped frame, near the outer ends thereof;

(B) a horizontally movable carriage;

(C) means mounting the C-shaped frame on the carriage with one arm of the C-shaped frame at a higher level than the other; and (D) means mounting and constraining the carriage to motion in opposite directions in a plane normal to the axes of the wheels and accurately transverse to the work support.

4. The band type cutoff machine of claim 3, further characterized by:

said means mounting the C-shaped frame on the carriage providing a pivotal connection between the trunk portion of the carriage and the C-shaped frame whereby the C-shaped frame can be swung to dispose said stretches of the band at different angles to the horizontal.

5. The band type cutoff machine of claim 2, further characterized by:

(A) said C-shaped frame being fixed with respect to the work support, with its arms upright and its trunk portion at an elevation above the work support and bridging the same;

(B) a pair of upright jack screws, one adjacent to slidably guided by an arm of the C-shaped frame for up and down motion; and (C) transmission means connected with said power means and with the carriers for constraining the carriers to move up and down in unison.

6. The band type cutoff machine of claim 5, further characterized by said transmission means comprising:

(A) a drive shaft connected with said power means to be rotatably driven thereby and extending along and parallel to the trunk portion of the C-shaped frame;

(B) a pair of upright jack screws, one adjacent to each arm of the C-shaped frame and each engaged in a threaded bore in one of the carriers; and (C) means providing a rotation transmitting connection between the drive shaft and each of the jack screws.

References Cited

UNITED STATES PATENTS

| | | |
|---|---|---|
| 853,479 | 5/1907 | Smith. |
| 1,461,004 | 7/1923 | Napier _____ 83—201.05 |
| 2,515,345 | 7/1950 | Hayes _____ 143—19 |
| 2,602,987 | 7/1952 | Wells _____ 83—201.06 X |
| 2,898,669 | 8/1959 | Crane et al. _____ 83—201.06 |

FOREIGN PATENTS

| | | |
|---|---|---|
| 595,055 | 9/1925 | France. |
| 107,985 | 7/1927 | Austria. |

WILLIAM S. LAWSON, Primary Examiner

U.S. Cl. X.R.

83—201.15

UNITED STATES PATENT OFFICE
CERTIFICATE OF CORRECTION

Patent No. 3,474,693                  October 28, 1969

James W. Wilkie et al.

It is certified that error appears in the above identified patent and that said Letters Patent are hereby corrected as shown below:

Column 2, line 21, "band cutoff saw" should read -- band type cutoff saw --; line 24, "mcahine" should read -- machine line 42, "workpicee" should read -- workpiece --. Column 5, line 32, the first word of the sentence should read -- of --. Column 6, lines 15 to 17, should read -- a pair of carriers, one for each band wheel, each slidably guided by an arm of the C-shaped frame for up and down motion; and --.

Signed and sealed this 26th day of May 1970.

(SEAL)

Attest:

Edward M. Fletcher, Jr.                        WILLIAM E. SCHUYLER, JR.

Attesting Officer                                    Commissioner of Patents